United States Patent [19]

McClure

[11] Patent Number: 5,354,071

[45] Date of Patent: Oct. 11, 1994

[54] WELDED WEAR SLEEVE FOR LUBRICANT SEALS

[75] Inventor: Philip R. McClure, Van Wert, Ohio

[73] Assignee: Federal-Mogul Corporation, Southfield, Mich.

[21] Appl. No.: 33,063

[22] Filed: Mar. 11, 1993

Related U.S. Application Data

[63] Continuation of Ser. No. 837,502, Feb. 18, 1992, abandoned.

[51] Int. Cl.⁵ ............................................. F16J 15/32
[52] U.S. Cl. ............................. 277/35; 277/152; 277/153; 138/171; 228/157
[58] Field of Search ............... 277/237 R, 35, 30, 152, 277/153, 37; 29/330, 414, 417, 898.056, DIG. 41; 138/128, 171; 72/122, 370; 228/49.3, 149, 157

[56] References Cited

U.S. PATENT DOCUMENTS

| | | | |
|---|---|---|---|
| 1,759,906 | 5/1930 | Kerruish | 29/898.056 |
| 2,722,047 | 11/1955 | Cousino | 29/898.056 |
| 2,818,283 | 12/1957 | Hutterer | 277/4 |
| 3,207,521 | 9/1965 | Dega | 277/153 |
| 3,214,180 | 10/1965 | Hudson et al. | 277/153 |
| 3,363,911 | 1/1968 | McKinven, Jr. | 277/153 |
| 3,455,004 | 7/1969 | Tethal | 29/417 X |
| 3,879,897 | 4/1975 | Kato | 29/417 X |
| 3,917,286 | 11/1975 | Loyd | 277/37 |
| 3,927,450 | 12/1975 | Sommer et al. | 29/417 X |
| 4,612,789 | 9/1986 | Andriessen | 29/417 X |
| 4,723,350 | 2/1988 | Kobayashi et al. | 277/134 X |
| 4,751,777 | 6/1988 | Savel, III | 29/898.056 |
| 4,907,626 | 3/1990 | Mori | 29/898.056 |

FOREIGN PATENT DOCUMENTS

| | | | |
|---|---|---|---|
| 2300670 | 7/1974 | Fed. Rep. of Germany | 29/898.054 |
| 0292162 | 7/1991 | Fed. Rep. of Germany | 29/417 |
| 0292166 | 7/1991 | Fed. Rep. of Germany | 29/417 |
| 0168971 | 9/1985 | Japan | 277/30 |

Primary Examiner—William A. Cuchlinski, Jr.
Assistant Examiner—Scott W. Cummings
Attorney, Agent, or Firm—Lawrence J. Shurupoff

[57] ABSTRACT

A wear sleeve is formed from a tube which is expanded radially into a true cylindrical configuration and then machined on its inner and outer surfaces to improve the tube surface finish. The machining operations include machining V-shaped annular grooves at preselected locations along the tube. Wear sleeves are cut-off from the tube on radial planes passing through the grooves so that the grooves form chamfers on the ends of the wear sleeves.

7 Claims, 2 Drawing Sheets

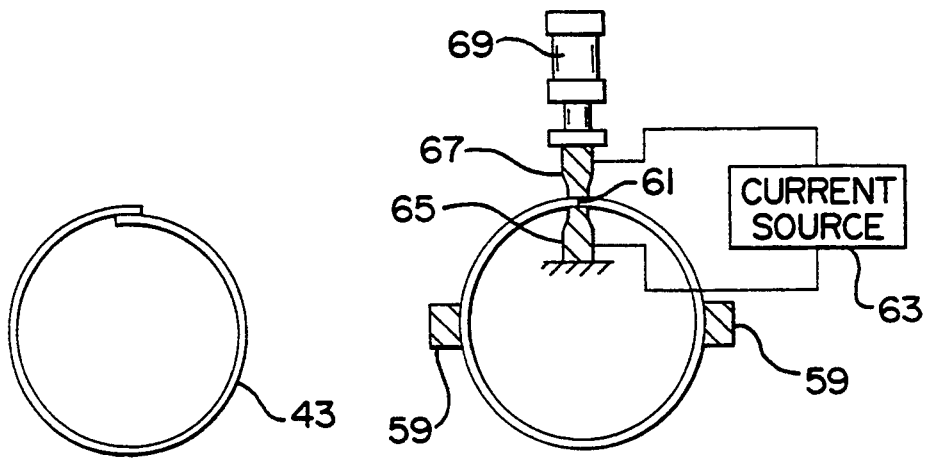
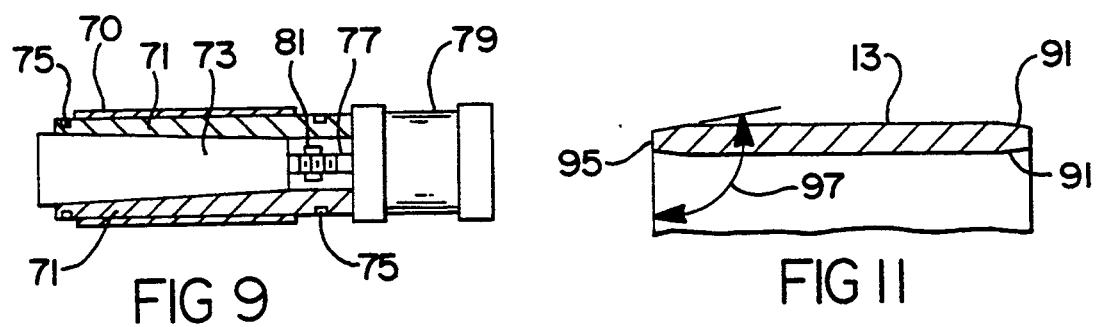
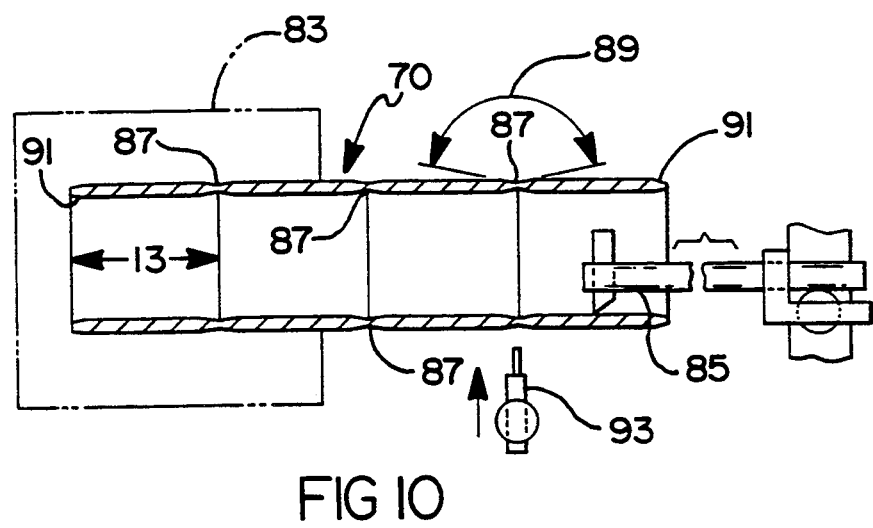

WELDED WEAR SLEEVE FOR LUBRICANT SEALS

This is a continuation of co-pending application Ser. No. 837,502 filed on Feb. 18, 1992, now abandoned.

BACKGROUND OF THE INVENTION

Field of the Invention

This invention relates in general to wear sleeves for use on circular shafts for engagement with annular seals. In particular, the invention relates to a wear sleeve for use with an annular seal used in association with an anti-friction bearing to retain liquid lubricant within the bearing.

Description of Prior Developments

Shaft surfaces are usually left relatively rough in order to minimize shaft-machining expenses. This presents a sealing problem insofar as a rough shaft surface will not seal properly against an associated annular elastomeric seal surface. Moreover, the machine marks tend to cut into the seal surface so as to shorten the seal life. To overcome these problems, smoothly-surfaced wear sleeves are often press-fit onto the shafts to provide a smooth surface in slidable engagement with an associated annular shaft seal.

Wear sleeves are shown in U.S. Pat. No. 2,818,283 to Hutterer, U.S. Pat. No. 3,207,521 to Dega, and U.S. Pat. No. 3,214,180 to Hudson, et al. In its simplest form, the wear sleeve may merely be a cylindrical tube having an axial length of about one inch and a radial wall thickness of about 0.05 inch. The tube inner diameter is about equal to or marginally smaller than the shaft diameter to permit installation of the tube or sleeve onto the shaft by a press-fit operation.

Wear sleeves are commonly formed from flat sheet material by a stamping and drawing process. Initially, annular flat metal disks are stamped from a flat sheet. Each disk is then subjected to a cold extrusion or drawing process whereby the annular disk is reformed into an annular sleeve configuration in a known fashion.

This conventional process generates a considerable amount of scrap material since the circular sections that form the holes in the annular disks are scrap. Typically, the scrap losses are as much as 60% of the raw material used. The present invention involves an economical process for making wear sleeves wherein scrap losses are/ considerably reduced. Typically, the scrap loss is about 5%.

SUMMARY OF THE INVENTION

The present invention involves a method of forming wear sleeves wherein a tubular blank is expanded to give the tube a true circularity. Thereafter, the inner and outer surface of the expanded tube are machined to provide a surface smoothness of about 10–20 RMS microinches. The machining operations involve machining annular V-shaped grooves in the tube surface at regularly spaced points.

The machined tube is cut or severed on radial planes going through the apices of the V-shaped grooves whereby a wear sleeve is formed by each cutting operation. The V-groove surfaces form chamfers on the ends of the sleeves. Such chamfers facilitate press-fitting of the sleeve over a shaft and facilitate the installation of an annular seal on the wear sleeve.

Chamfers on the sleeves are achieved as part of the tube machining operations used to form smooth surfaces on the tube. The individual wear sleeves do not have to be individually machined. All of the machining operations are performed prior to formation of the individual sleeves, that is, while the sleeves are joined together as integral portions of an elongated tube.

A significant feature of the invention is the tube expansion step which gives the tube a true circularity. By making the tube truly circular before any machining operations on the tube, the amount of machining and metal removal is greatly reduced since only the surface roughness of the tube has to be removed by the machining operations. There is no requirement for machining the tube into a precise circularity since circularity is achieved prior to the machining operations.

BRIEF DESCRIPTION OF THE DRAWINGS

FIG. 7 is an end view of a tube formed by the apparatus of FIGS. 5 or 6.

FIG. 8 schematically shows a welding apparatus for resistance welding a seam extending axially along the FIG. 7 tube.

FIG. 9 schematically shows an apparatus for expanding the welded tube of FIG. 8.

FIG. 10 schematically shows a machining apparatus that can be used to machine the surfaces of the expanded tube after its removal from the FIG. 9 expansion apparatus.

FIG. 11 is an enlarged fragmentary sectional view of a wear sleeve produced from the tube shown in FIG. 10.

In the various figures of the drawing, like reference characters designate like parts.

DETAILED DESCRIPTION OF THE PREFERRED EMBODIMENTS

Figure 1:
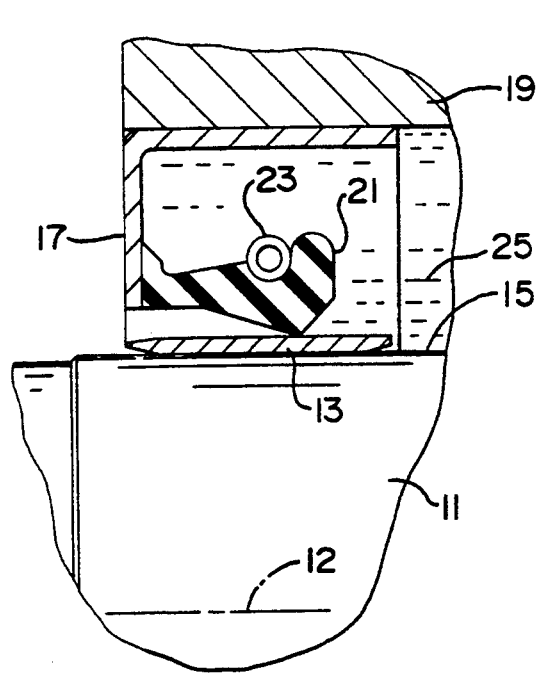
FIG. 1 is a fragmentary view of a shaft and seal assembly utilizing a wear sleeve of the present invention.

FIG. 1 shows a circular shaft 11 having a rotational axis 12. A cylindrical wear sleeve 13 of the present invention is press-fit on the relatively rough surface 15 of the shaft. The inner and outer surfaces of sleeve 13 are generally relatively smooth with an RMS surface roughness of about 10–20 microinches.

An annular shaft seal 17 is mounted in shaft housing 19 so that an annular elastomeric sealing element 21 thereof is in pressure contact with the outer surface of wear sleeve 13. A garter spring 23 biases the sealing element into firm sliding contact with the wear sleeve so that the seal prevents oil 25 from migrating leftwardly across the seal-sleeve interface.

The axial ends of sleeve 13 are chamfered at the sleeve inner surface and also at the sleeve outer surface. The chamfering is to facilitate the press-fit insertion of the wear sleeve on shaft 11 and to facilitate convenient installation of the shaft seal into housing 19 during insertional movement of shaft 11 through the seal. FIG. 11 more clearly shows the chamfers formed on the ends of the wear sleeve.

Figure 2:
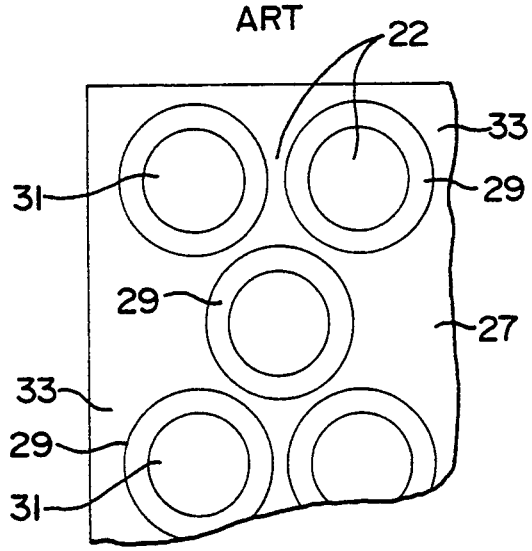
FIG. 2 shows a sheet of material used to form wear sleeves according to conventional practice.

FIG. 2 shows a flat steel sheet 27 used to form wear sleeves according to conventional practice. The sheet may have a thickness of about 0.075 inch. Annular disks 29 are stamped out of sheet 27 leaving circular sheet sections or islands 31 and surrounding border sections 22 as scrap. Scrap losses can be in excess of 50%.

Each flat annular disk 29 can be reconfigured into a cylindrical wear sleeve shape by placing the disk in a closed cold extrusion die that has an annular space between the die side wall and the punch. The disk material is forced into the annular space to assume a sleeve configuration. One problem with such a process is the large scrap losses associated with stamping out the annular disks.

Figure 3:
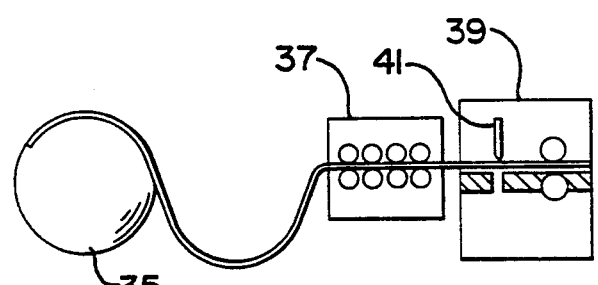
FIG. 3 is a schematic view of a sheet straightening apparatus and sheet slitting apparatus that may be used in the practice of the present invention.

FIGS. 3 through 10 illustrate features of an alternate process of the present invention designed to avoid the large scrap losses. Referring to FIG. 3, sheet metal is taken from a large diameter helically would coil 35 and passed through a straightener device 37 and cutter 39. The cutter may be equipped with a knife blade 41 whereby the sheet is severed into individual rectangular sheets 43.

Figure 4:
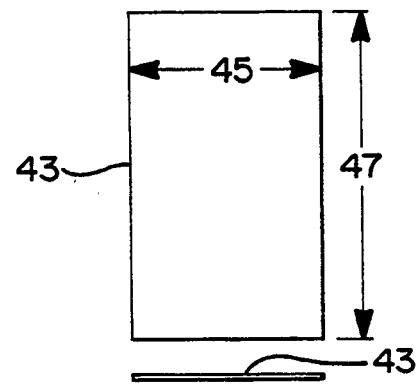
FIG. 4 shows a steel sheet produced by the FIG. 3 apparatus.

As seen in FIG. 4, the individual sheet has a first dimension 45 and a second dimension 47. Dimension 45 will be slightly less than the circumference of an individual wear sleeve that is to be produced from the sheet. Dimension 47 will be a multiple of the individual wear sleeve length, plus a slight amount for machining the sheet ends to achieve edge straightness. The steel sheet, if steel is used, can have a thickness of about 0.05 or 0.06 inch.

Figure 5:
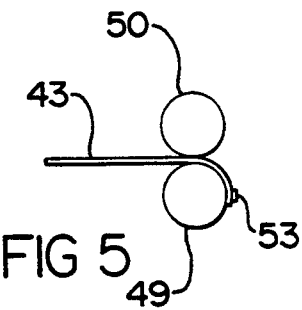
FIG. 5 schematically shows an apparatus that can be used to transform the FIG. 4 sheet into a tubular configuration.

Rectangular sheet 43 is passed .through a coiling apparatus to transform it into a circular tube configuration. As shown in FIG. 5, the coiling apparatus includes two rolls 49 and 50. A clamp 53 is associated with roll 49 so that the sheet is curled into a tubular shape as roll 49 is powered in a clockwise direction.

Figure 6:
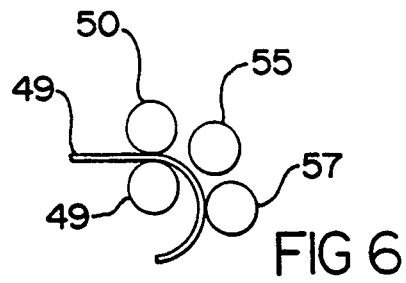
FIG. 6 shows an alternative apparatus to that shown in FIG. 5.

FIG. 6 shows an alternate apparatus wherein idler rolls 55 and 57 are arranged in the path of the rectangular sheet. As roll 49 feeds the sheet against rolls 55 and 57, the sheet is bent into a tube shape.

FIG. 7 shows the tubular sheet produced by the apparatus of FIGS. 5 and 6. The ends of the sheet may overlap slightly such that some force is required to pull the ends apart. The tube can then be positioned in a welding fixture with the sheet ends abutted together as shown in FIG. 8. The overlap shown in FIG. 7 causes a tension force to be generated in the strip when the strip ends are forced apart. When the strip ends snap back into abutment as in FIG. 8, the ends are in pressure engagement due to the tension force generated in the strip material. Two vice jaws 59 may be advanced against tube 43 to ensure pressure contact between the sheet ends. The vice can be an alternate or supplement to the automatic tension generated by the overlap depicted in FIG. 7.

A welding operation is performed on the axial seam 61 formed by the abutted ends of the tube wall. A high amperage electrical current is supplied by source 63 to electrodes 65 and 67 that are clamped to the inner and outer surfaces of the tube. Each electrode can be an elongated bar having a length equal to or slightly greater than the axial length of the tube, i.e. the transverse dimension 47 in FIG. 4.

Current flow across the electrodes fuses the tube material to form a welded connection. Preferably, the electrodes are in pressure contact with the sheet 43 surfaces to promote high current flow. A fluid cylinder 69 may be associated with electrode 67 to provide a desired clamp force.

The FIG. 8 welding apparatus is useful when the tube length dimension 47 is relatively small, e.g., on the order of seven inches. When the tube has an appreciable axial length dimension, it may be more appropriate to use roller-type electrodes. The roller electrodes would move simultaneously along seam 61 on the inner and outer surfaces of the tube to progressively form a welded joint along the length of the seam. With long tubes, the tube ends could be held together with spot welds in lieu of jaws 59.

The tube formed by the FIG. 8 welding apparatus may have some undesired weld surface projections in the vicinity of seam 61. Such local projections can be removed by moving one grinding wheel along the seam on the tube outer surface, and a second grinding wheel along the seam on the tube inner surface. Alternately, a shaper can be used to shave away any weld projections on the inner or outer surfaces of the tube.

FIGS. 9 and 10 illustrate further treating operations that can be used to transform the FIG. 8 welded tube 70 into a multiple number of wear sleeves. At this point, the welded tube 70 has no special characteristics other than its dimensions, e.g., its length, diameter and wall thickness. Thus, conventional off-the-shelf tubing could be used as an alternative to manufacturing the tubing per the steps depicted in FIGS. 3 through 8. However, the tube manufacturing steps of FIGS. 3 through 8 may, in certain instances, be necessary in order to achieve a tube having the necessary combination of a particular diameter and wall thickness suited to press-fit installation on a particular diameter shaft.

FIG. 9 shows a tube expansion apparatus that can be used to give the tube 70 a true circularity. The apparatus includes a multiplicity of segmental expansion elements 71 circumferentially arranged around an elongated tapered plug 73. Annular garter springs 75 encircle expansion elements 71 to keep them in place on plug 73. A piston rod 77 extends from plug 73 into a fluid cylinder 79. Stop nut 81 can be adjustably positioned on rod 77 to determine the stroke of rod 77 into the fluid cylinder.

The number of expansion elements 71 can vary. Typically, there will be eight expansion elements. The outer surface of each expansion element will be in the form of a segment of a cylindrical surface. The inner surface of each expansion element can be a segment of a conical surface in slidable engagement with a conical mating surface on plug 73.

As shown in FIG. 9, tube 70 can be slid axially onto expansion elements 71, after which the fluid cylinder 79 can be pressurized to pull plug 73 in a left-to-right direction. Tube 70 is thereby expanded a slight amount depending on the stroke distance of rod 77.

The tube expansion process is carried out so that the elastic limit of the tube material is exceeded, whereby the tube takes a permanent set with a plastically deformed inner diameter larger than its initial diameter. The change in tube diameter is on the order of one percent.

The principal purpose of the tube expansion step is to make the tube truly circular, i.e. to remove any out-of-roundness of the tube. By thus making the tube truly circular, it can be machined on its inner and outer surfaces to achieve a smooth surface finish without a long, time-consuming machining operation. The machining is used only to eliminate surface irregularities and not to achieve tube circularity.

FIG. 10 schematically shows a lathe apparatus for machining the inner and outer surfaces of the expanded tube 70 after its removal from the FIG. 9 expansion apparatus. The tube is held in a conventional powered chuck 83 so that a conventional boring bar 85 and turning tool can be moved axially and radially to form a smooth interior finish on the tube.

Boring bar 85 is operated so that the associated cutting tool forms V-shaped annular grooves at spaced points along the tube interior surface. The outer surface of tube 42 is similarly surface finished by an external tool to include axially spaced, V-shaped annular grooves. In FIG. 10, the various V-shaped grooves are referenced by numeral 87. The grooves on the outer surface of the tube are in radial alignment with corresponding grooves on the tube inner surface.

The included angle of each V-shaped groove 87 is indicated by numeral 89 which illustrates an included angle of approximately 160°. As shown in FIG. 10, there are three V-shaped grooves 87 machined into the tube outer surface and three V-shaped grooves 87 machined into the tube inner surface. Additionally, the ends of the tube are machined to form internal and external annular chamfers designated by numeral 91. It is necessary to rechuck the tube, that is, reverse the tube end-for-end in order to perform all the machining operations. In an automated apparatus, some of the machining could be performed at one station and the remaining operations performed in a second station.

The tube shown in FIG. 10 is used to form four individual wear sleeves configured as shown in FIGS. 1 and 11. To form a given wear sleeve, a cut-off tool 93 is advanced radially through the tube wall on a radial plane extending through the apex of one set of V-shaped grooves 87. The cutting operation severs one wear sleeve 13 from the tube so that the groove surfaces on the severed sleeve form chamfers on that sleeve.

Thus, the chamfer surface 91 shown on an end of the FIG. 11 wear sleeve may have been a groove surface prior to the cut-off operation. All of the chamfer surfaces on the severed sleeves are formed during the machining operations on tube 43. With the V-shaped angulation of 160°, as at 89, each chamfer surface extends at an angle 97 of 100° to sleeve end face 95.

FIG. 10 shows a tube 70 having a length designed to form four wear sleeves 13. A longer tube will of course enable more wear sleeves to be produced from a given tube. The length of the tube is related to such factors as the tube strength, cantilever forces encountered with a particular chucking set-up, cutting characteristics of the tube and capacity of the cutting machine.

The principal features of the invention are the tube expansion feature of FIG. 9 whereby the tube is given a true circularity, and the machining feature of FIG. 10 whereby the chamfers may be formed on individual wear sleeves as part of the tube surface finishing operation.

The drawings necessarily show specific apparatus used in the practice of the invention. However, it will be appreciated that different types of apparatus may be used while still practicing the invention.

What is claimed is:

1. A radially-expanded annular tubular blank forming a plurality of seal-engagement wear sleeves; said tubular blank comprising an elongated cylindrical tube formed from sheet metal and having a machined inner surface, a machined outer surface, and a pair of abutted end portions; and an axial weld interconnecting said end portions; a plurality of evenly spaced grooves on the tube inner surface, and a number of grooves on the tube outer surface; said grooves being radially aligned so that, when the tube is cut on radial planes passing through the grooves, the grooves will form chamfers on the ends of the sleeves; said tubular blank comprising a predetermined circularity defined by a permanent set plastically deformed in said sheet metal by radial expansion of said inner surface and said outer surface and said machined outer surface comprising a seal-engaging surface machined to a RMS surface finish of about 10 to 20 microinches.

2. The tubular blank of claim 1, wherein each groove is formed as a V-shaped groove and wherein the included angle of each V-shaped groove is approximately 160°.

3. A radially-expanded annular seal-engagement wear sleeve for use on a circular shaft, said wear sleeve comprising a cylindrical sleeve formed from rolled sheet metal and having an axis, opposite flat ends located in a radial plane normal to the axis, and an axially-extending seam defined by edge portions of said sheet metal, an axially-extending weld interconnecting said edge portions along said seam; each flat end having an internal annular chamfer to facilitate insertion of the sleeve structure on a shaft; each flat end having an external chamfer to facilitate installation of a seal around the sleeve structure; said wear sleeve comprising an inner machined surface portion and an outer machined surface portion; said outer machined surface portion comprising a predetermined RMS surface finish of about 10 to 20 microinches; and said wear sleeve comprising a predetermined circularity defined by a permanent set plastically deformed in said sheet metal by radial expansion of said rolled sheet metal.

4. The wear sleeve of claim 3, wherein each chamfer is angled to the associated flat end at an included angle of about 100°.

5. A radially-expanded annular tubular wear sleeve comprising a cylindrical tube formed from sheet metal, said tube comprising a seal-engaging outer surface portion having a predetermined RMS surface finish of about 10 to 20 microinches, a pair of axially-extending end portions and a weld interconnecting said end portions, and wherein said tube comprises a predetermined circularity and inner diameter defined by radial expansion of said tube into a plastically deformed inner diameter.

6. The sleeve of claim 5, wherein said blank further comprises an inner machined surface portion and an outer machined surface portion.

7. The sleeve of claim 5, wherein said radial expansion is on the order of one percent of said diameter.

* * * * *